(12) United States Patent
Bonthuis et al.

(10) Patent No.: US 11,346,704 B2
(45) Date of Patent: May 31, 2022

(54) LOAD SENSOR BUCKET AND RELATED METHOD

(71) Applicant: AIS Construction Equipment Corporation, Grand Rapids, MI (US)

(72) Inventors: Allen Bonthuis, Conklin, MI (US); Chad Fullerton, Bay City, MI (US)

(73) Assignee: AIS Construction Equipment Corporation, Grand Rapids, MI (US)

( * ) Notice: Subject to any disclaimer, the term of this patent is extended or adjusted under 35 U.S.C. 154(b) by 139 days.

(21) Appl. No.: 16/822,500

(22) Filed: Mar. 18, 2020

(65) Prior Publication Data

US 2020/0300691 A1 Sep. 24, 2020

Related U.S. Application Data

(60) Provisional application No. 62/820,520, filed on Mar. 19, 2019.

(51) Int. Cl.
*G01G 19/12* (2006.01)
*G01G 19/62* (2006.01)
*G01G 17/00* (2006.01)

(52) U.S. Cl.
CPC ............. *G01G 19/12* (2013.01); *G01G 17/00* (2013.01); *G01G 19/62* (2013.01)

(58) Field of Classification Search
CPC ......... G01G 19/12; G01G 17/00; G01G 19/62
See application file for complete search history.

(56) References Cited

U.S. PATENT DOCUMENTS

| | | | | |
|---|---|---|---|---|
| 4,230,196 A | * | 10/1980 | Snead | .................... E02F 3/3411 177/141 |
| 5,230,393 A | * | 7/1993 | Mezey | ....................... B65F 3/08 177/139 |
| 8,674,243 B2 | * | 3/2014 | Curotto | .............. G01G 23/3735 177/136 |
| 9,347,817 B2 | * | 5/2016 | Pollock | ................... B62B 3/106 |
| 10,072,397 B2 | * | 9/2018 | Claxton | ................ E02F 9/2271 |
| 2012/0318791 A1 | * | 12/2012 | Roman | ................... B65D 21/02 220/23.9 |
| 2016/0356640 A1 | * | 12/2016 | Freeman | .............. G08B 21/182 |

FOREIGN PATENT DOCUMENTS

| | | |
|---|---|---|
| JP | 2010159548 A | 7/2010 |
| KR | 101417038 B1 | 7/2014 |

* cited by examiner

*Primary Examiner* — Randy W Gibson
(74) *Attorney, Agent, or Firm* — Warner Norcross + Judd LLP

(57) ABSTRACT

A load sensor bucket for equipment is operable in a loading mode and a metering mode. In the loading mode, the bucket is disposed to load material. In the metering mode, the bucket is tilted upward with the load sensors oriented to form a vertical metering column that is substantially perpendicular to a ground surface. In the metering mode, the bucket orients a center of mass of the material within the vertical metering column so that the load sensors can measure the bucket load. The measurement can be conveyed to an operator of the machine, who can then determine real time whether the bucket is loaded to a target amount of material. A related method can include detecting a load parameter, such as stress/strain, via the load sensors and displaying output in a cab.

20 Claims, 9 Drawing Sheets

LOAD SENSOR BUCKET AND RELATED METHOD

BACKGROUND OF THE INVENTION

The present invention relates to heavy equipment, and more particularly to a material handling bucket including load sensors.

Heavy equipment is used in various industries to move material from one location to another. One type of machine used to move material is a front end loader. This machine typically includes a bucket coupled to a set of arms on the front of a wheeled frame. The bucket can be slid across the ground and pushed into piles of material in particulate or other forms. The bucket can be tilted and lifted to retain the material therein. The material can then be transported in the bucket from the pile to another location.

Front end loaders and other heavy equipment with buckets are used to move large quantities of material. To do so, a front end loader may have to make multiple trips to move the appropriate amount of material from a pile of the material to another location. When a bucket is initially filled, it can be difficult for an operator to judge how much material is in the bucket. Sometimes, there may be too much material, and other times there may be an inadequate amount of material. Thus, during the course of transport, after many bucket loads are carried from one location to another, the amount of material actually transported can be grossly off the amount needed. When the bucket is not filled to capacity on every trip, extra trips may need to be taken to adequately move enough material. These extra trips consume extra fuel, require higher labor cost, cause extra wear and tear on the loader, and can hold-up further material processing or usage operations in some cases.

Accordingly, there remains room for improvement in the field of metering loads of material that are transported in buckets of heavy equipment to ensure efficient use of that equipment.

SUMMARY OF THE INVENTION

A load sensor bucket for a piece of equipment is operable in a loading mode and a metering mode to precisely measure an amount of material in the bucket and efficiently transport that material.

In one embodiment, in the loading mode, the bucket is oriented to load material. In the metering mode, the bucket is tilted with one or more load sensors oriented to form a vertical metering column that can be substantially perpendicular to a ground surface or reference plane. In the metering mode, the bucket orients a center of mass of the material within the vertical metering column. The load sensors measure the load of material in the bucket while the center of mass is in the vertical metering column.

In another embodiment, the measurement of the load can be conveyed to an operator of the machine, who can then determine in real time whether the bucket is loaded to a target amount of material. The measurement can be displayed on a display located near the operator, for example, in a cab of the machine to which the bucket is attached.

In still another embodiment, the bucket can include multiple ears extending from the bucket. A load frame can be joined with the bucket via the ears. The load frame can define multiple sensor holes, with the load sensors extending through respective sensor holes. The load sensors can be bridged between spaced plates of the load frame. The ears can be supported by the load sensors between the spaced plates of the load frame.

In yet another embodiment, the bucket can include a quick coupler joined with the load frame. The quick coupler can be configured to removably connect the bucket to an equipment boom. The quick coupler can include one or more pin recesses to receive one or more pins to quickly and detachably join the coupler to the boom.

In even another embodiment, each of the load sensors can be in the form of a pin that projects through respective sensor holes defined by the load frame and the ears. The sensor holes can be distal from, and laterally, outwardly displaced relative to one or more pin recesses of the quick coupler. Generally, the coupler pin recesses can be distal from the load sensor holes of the load frame.

In another embodiment, the bucket can include an inner bucket and an outer bucket. The inner bucket and outer bucket can be spaced from one another, with the inner bucket suspended in the outer bucket. One or more load sensors can be disposed between or otherwise joined with both the inner bucket and the outer bucket. When the inner bucket is loaded with material, the sensors between the two buckets can be placed under stress or strain due to the weight of the material in the inner bucket.

In yet another embodiment, the bucket with the inner and outer buckets can be operable in the metering mode. The bucket can be tilted so the inner bucket is generally above the outer bucket, with the load sensors between the two buckets. The load sensors between those buckets can be oriented to form a vertical metering column that can be substantially perpendicular to a ground surface or reference plane. In the metering mode, the bucket orients a center of mass of the material within the vertical metering column. The load sensors measure the load of material in the bucket while the center of mass is in the vertical metering column. The load sensors themselves may or may not be in a common horizontal plane.

In still another embodiment, the inner bucket can include a shell having a rear wall that transitions to a floor a curved or angled transition wall, as well as opposing side plates. The outer bucket can include its own rear wall that transitions to a floor of the same at a curved or angled transition wall, as well as opposing side plates. The inner side plates can impair or prevent material from entering between the inner and outer buckets, which might impair the ability of the load sensors to accurately measure loads, due to the material preventing or impairing the inner bucket to move slightly relative to the inner bucket.

In even another embodiment, one or both of the inner bucket rear wall and floor can slope, curve, angle and/or flare outward, away from a central axis of the inner bucket, with an upper and/or lower edge of the inner bucket being disposed closer to the respective outer bucket rear wall and/or floor at upper and lower edges of the outer bucket.

In still even another embodiment, the bucket can include one or more cover plates. An upper cover plate can project from an upper edge of the outer bucket, and over an upper edge of the inner bucket to impair or prevent material from lodging between the outer bucket and the inner bucket in that location. A gasket constructed from a low friction or sealing material can be disposed between the upper edge and the cover plate to promote movement between the edges and material from entering between the two buckets.

In yet another embodiment, a lower cover plate can project from a lower edge of the outer bucket, and over a lower edge of the inner bucket to impair or prevent material from lodging between the outer bucket and the inner bucket in that location. The gasket noted above can be disposed between the lower edge and the cover plate to promote movement between the edges and material from entering between the two buckets.

In even another embodiment, the outer bucket can include one or more drain holes below a central axis of the bucket. The drain holes can enable material that might enter between the inner and outer buckets to evacuate the space between those buckets. In turn, that material will not remained trapped between the inner and outer buckets, which otherwise might interfere with a proper, accurate measurement of the material obtained by the load sensors. For example, trapped material might bear part of the load in the inner bucket, instead of the load sensors bearing that part of the load to collect a valid measurement.

In a further embodiment, each load sensor can be in communication with a user interface configured to be disposed in the operator's view in a cab of the machine. Each load sensor can be configured to communicate a signal to a controller associated with the user interface, the signal indicative of the load of material when the bucket is in the metering mode.

In still a further embodiment, the user interface is a display, for example, a screen. The display can be configured to output alphanumeric data or information related to weight of the load of material when the bucket is in the metering mode. The output data can include a target weight and an actual weight, extrapolated from load sensor signals generated by the load sensors that sense stress, strain or other load parameters due to their interaction with the load frame and bucket ears. With this data being output, the operator of the bucket and equipment in general can determine the relationship of the measured load to a target load of material by viewing the alphanumeric data or information. Based on that comparison, the operator can push the bucket into the material again to add more material, or dump some material, to achieve the target weight if appropriate.

In yet a further embodiment, a method of loading material with a machine is provided. The method can include: moving a bucket of the machine into a pile of material; capturing a first bucket load of the material, the first bucket load including a center of mass; rotating the bucket about at least one axis to position the center of mass within a vertical metering column that is defined by multiple load sensors; detecting at least one first load parameter via the load sensors to generate a first signal indicative of a first measurement of the first bucket load of material; and displaying output on a user interface in a cab of a machine associated with the first signal whereby an operator of the machine can determine whether the first measurement does or does not correspond to a target amount of the material.

In even a further embodiment, the at least one load parameter is stress and/or strain exerted on at least one of the load sensors. The target amount can be a target weight, target mass and/or target volume of the material. The load sensors can include at least one of a stress gauge and a strain gauge.

In another, further embodiment, if the first measurement does not correspond to the target amount of material, the method can include moving the bucket into the pile again to add material to the first bucket load of material, thereby forming a second bucket load of material; detecting at least one second load parameter via the load sensors to generate a second signal indicative of a second measurement of the second bucket load of material; displaying output on the user interface associated with the second signal so that the operator can confirm the second measurement does correspond to the target amount of the material; and moving the second bucket load of material to another location distal from the pile.

In still another, further embodiment, the method can be utilized in an agricultural operation. For example, the load sensor bucket can be mounted to a front end loader, skid steer, tractor or other equipment. The material can be feed stock, such as haylage, silage, grain, ground hay, concentrates or other feed material. The bucket can be used to transport the feedstock from one location to another on a farm, for example, from a storage bunker to a feed mixer, where that material and other materials, such as premixes and feed additives can be mixed and blended together to prepare a specific feed having a particular composition for livestock. The load sensor bucket can be used to maximize the efficiency of the material transport process by ensuring that the operator can determine the amount of material in the bucket. Where not enough material is in the bucket after the bucket is loaded, the operator sees this on the display, and thus can add more material to maximize or precisely load the bucket before transport to another location. Alternatively, the operator can dump material from the bucket if too much material is measured.

The current embodiments of the apparatus and related method of measuring a bucket load of material in real time can maximize efficiency in loading that material for further transport to another location. For example, as mentioned above, the load sensor bucket can measure the amount of material in the bucket and output that amount to an operator of the equipment. The operator can determine real time whether the measured amount is sufficiently close to a target amount. If the measured amount is insufficient, the operator can be informed of this immediately, and can load more material or dump some material before moving the material a distance. In turn, this can minimize the number of transport trips, reduce wear and tear on the machine, reduce fuel consumption and reduce labor costs to run the machine and move the material.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

Figure 1:
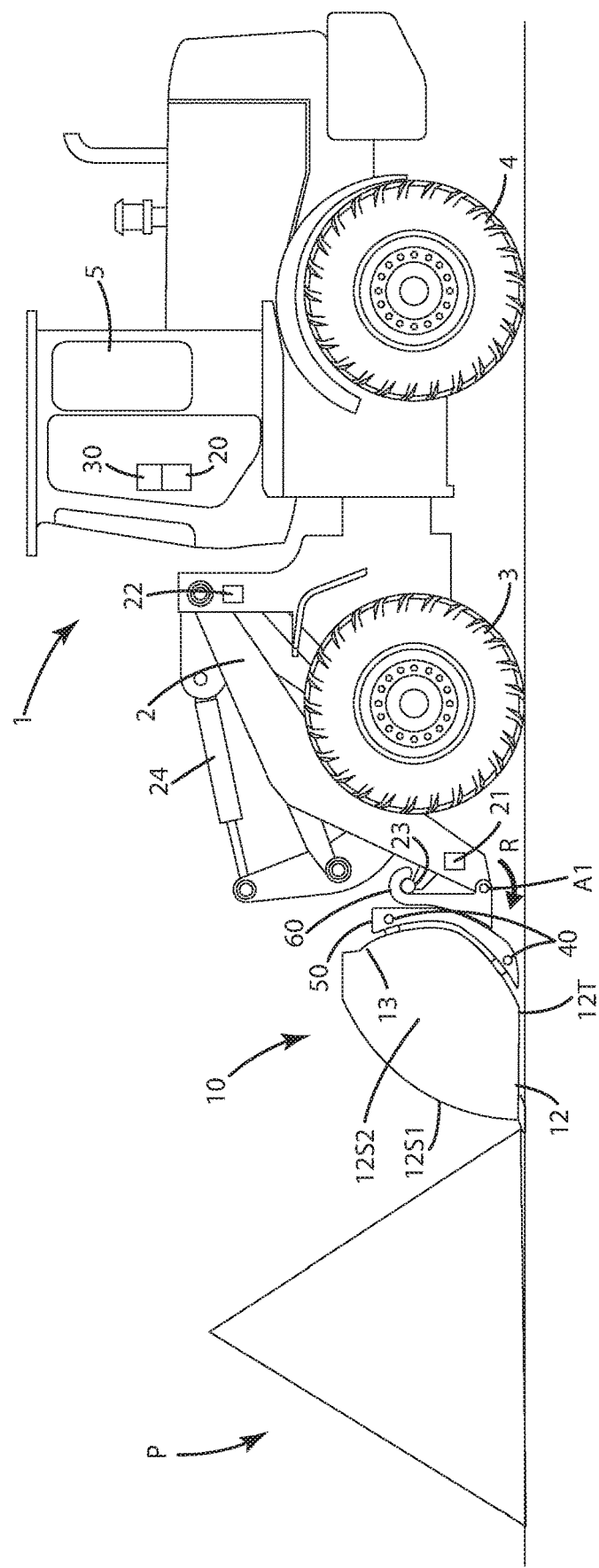
FIG. 1 is a perspective view of the load sensor bucket of a current embodiment on a machine about to load the bucket with material from a pile of material.

A current embodiment of the load sensor bucket is illustrated in FIGS. 1-6, and generally designated 10. As shown in FIG. 1, the bucket 10 is mounted to a machine 1 having a boom or arms 2, front wheels 3 and back wheels 4. The machine 1 is depicted as a wheel loader having an internal combustion engine for propulsion, powering hydraulics and other machine systems. Although shown as a wheel loader, the machine can be any of a variety of other loading machines such as a backhoe loader, a telehandler, a machine with a telescoping boom, a track-type loader, a skid steer, a tractor, or any other machine capable of loading and transporting relatively loose material.

The machine 1 can include an operator cab 5 and a boom 2 to which the bucket 10 is mounted. The machine 1 in FIG. 1 is shown as it might appear before engaging a material pile P to load bucket 10 with material. This material can be virtually any loose material, for example, aggregate, particulate, stones, powder, silage, haylage, feedstock, feed additives or other materials. The machine 1 can be equipped to controllably capture a range of payload weights of material from pile P, enabling relatively more efficient and accurate transport of the material and loading with the machine of other equipment such as a feed mixer, a truck, a rail car or some other container. Although it can be used for a variety of other applications, as described here, the machine 1 can be used in a loading cycle to capture and dump multiple bucket loads of livestock feed, such as silage, into a feedstock mixer container to fill the container to a target capacity, or within an acceptable error range thereof, optionally less than about 1,000 pounds.

The machine 1 can include a loading control system 20, which can include any appropriate electronic control module or electronic controller with appropriate programming software and hardware. The loading control system 20 can receive data from one or more sensors, such as a tilt sensor 21 and a lift sensor 22. The tilt sensor 21 can communicate a position of a bucket tilt actuator 23 to a controller of the system 20 via communication lines or a wireless communication such as Wi-Fi, Bluetooth or other wireless technology. The lift sensor 22 can communicate a position of a lift actuator 24 coupled with the boom or linkage 2 to the controller, also via communication lines or a wireless communication. One or both of the tilt sensor and lift sensor can be calibrated so that the controller can output on the display 30 or otherwise can process a configuration of the bucket 10 when that bucket is in a loading mode or a metering mode as described below. For example, the tilt sensor 21 and/or lift sensor 22 can be calibrated such that when the bucket and boom are in the configuration shown in FIG. 2, the controller can capture data or signals generated by or otherwise received from the load sensors 40. Like the other sensors, these load sensors can be in communication with the control system and its controller 20 via a wireless communication, Wi-Fi, or a physical line such as a wire (not shown).

An operator user interface, which can be in the form of a display 30, can be disposed in operator cabin 5 to provide an interface between an operator and machine. The user interface can be a passive display screen. Optionally, the user interface can be an interactive screen or a touchscreen. The interface can enable an operator to review output and information related to data collected by the sensors 21, 22 and the load sensors 40 as described below. Based on this output on the display, the operator can control and load the bucket 10 efficiently with a target amount of material to be transported via the bucket.

Figure 6:
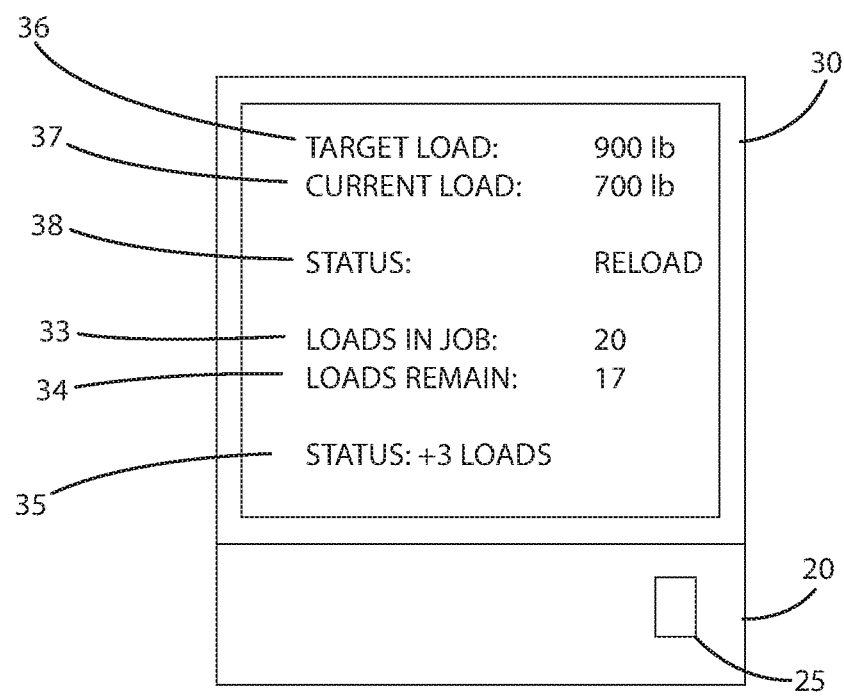
FIG. 6 is a display of information concerning data collected by the load sensors regarding the load of material in the bucket.

As shown in FIG. 6, the control system 20 can include an enable switch 25 that can be used to select a load routine for a particular material, a particular container to be filled, or other parameter. Optionally, the switch 25, which can be a toggle switch or button, can be manually switched between different states. For example, the operator can actuate the switch when they determine that the bucket is in a sufficient metering mode to take a measurement of material in the bucket. The operator can deactivate the switch when they determine that the bucket is out of the metering mode and in a loading mode instead. The operator can use the switch to actuate a particular target amount of material, adjust that target amount, input a new loading routine or loading cycle or otherwise alter particular parameters associated with operation of the load sensor bucket 10. Further optionally, the operator can actuate the system and select a particular loading routine. The loading routine can correspond to a number of loads in a job 33, which can be displayed on the display 30 in alphanumeric characters or indicia, as can other information, data, and measurements as described below. The controller 20 can effectively count the number of loads transported, for example, by monitoring when the loader travels a certain distance and/or dumps a load from the bucket. The controller can determine and output the number of loads remaining 34 to complete the job, and also output the loading status 35 to complete the job with a certain number of additional loads needed.

Figure 5:
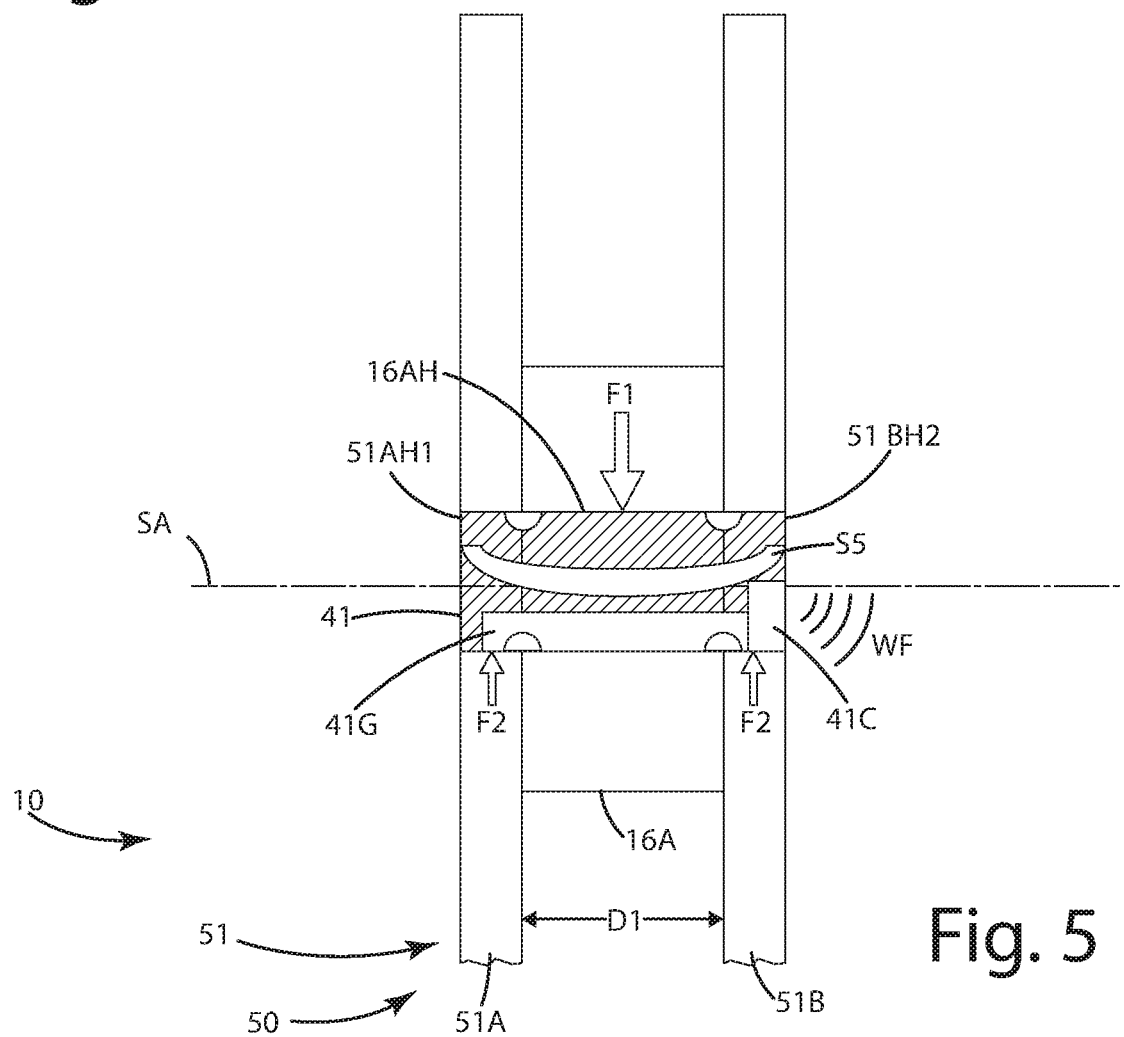
FIG. 5 is a close up view of a load sensor of the bucket under stress/strain due to a load in the bucket.

Each of the loads can be precisely metered or measured to ensure that the machine efficiently transports a precise amount of material from the pile to a container at a location distal from the pile as described below utilizing the load sensor bucket 10. The data and signals from the load sensors 40 can be processed by the controller 20, which can output that information on the display 30. For example, the controller can process signals from the respective load sensors captured during a metering mode of the bucket 10 as described below. The controller can then output information on the display 30 so that the operator can monitor the bucket loading operation. For example, the controller can output or display a particular target load 36 associated with a loading routine. The controller also can output a current load 37 of material in the bucket. The controller 20 can use an algorithm to determine the difference between the target load and the current load, and can output a status 38 via the display 30 to the operator. The status can include instructions to further achieve the target load based on the measurement of the current load. Instructions or status can instruct the operator to reload the bucket, which can include adding additional material to that material already in the bucket as shown in FIG. 5, or alternatively, dumping material from the bucket.

The controller 20 can include a memory that can store various data associated with loading jobs. The memory can store data obtained during execution of one or more loading cycles, such as payload data used in executing a particular loading job, the weight of the bucket 10, and other types of data which can be used to calibrate and refine an operation or routine. The memory can store payload data for full loads, such that a summed total weight of loaded material may be determined, then compared with the loads required for a particular job.

The tilt and lift sensors can be configured to detect a position of the tilt and lift actuators, respectively, or other information that may be used to determine a position, or velocity of lift and tilt actuators 24 and 22. In one embodiment, the lift and tilt sensors 22 and 21 can be associated with lift and tilt actuators, respectively, while in other embodiments, the lift and tilt sensors can be associated directly with a linkage and/or the bucket. Lift and tilt sensors can in some cases be, for example, position sensors which measure cylinder rod extension of the respective actuators. Alternatively, these sensors can be rotary sensors such as rotary potentiometers, configured to determine a relative angular position of linkages or the bucket 10. These sensors can be utilized by the controller to detect when the bucket is tilted or otherwise positioned in an orientation sufficient to produce a vertical metering column VMC via the load sensors. Optionally, the tilt sensors can detect when the bucket is tilted to its maximum rearward configuration, or some other position, which can set the load sensors in position to form the vertical metering column VMC. With the vertical metering column formed, the bucket can be in its metering mode.

Figure 2:
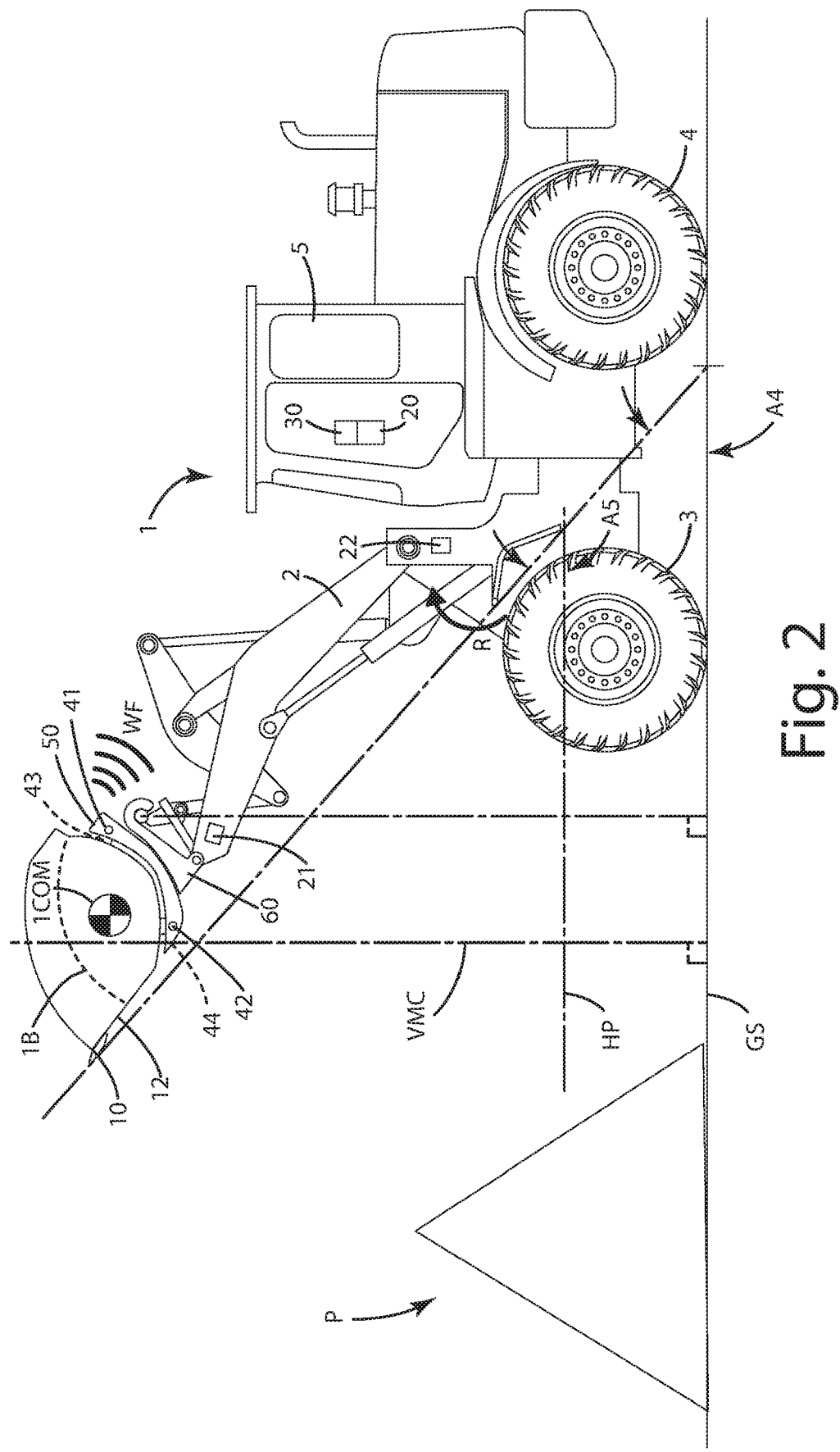
FIG. 2 is another perspective view of the load sensor bucket on a machine tilted upward with the bucket loaded and positioned and so that load sensors produce a vertical metering column within which a center of mass of the load is located.
Figure 3:
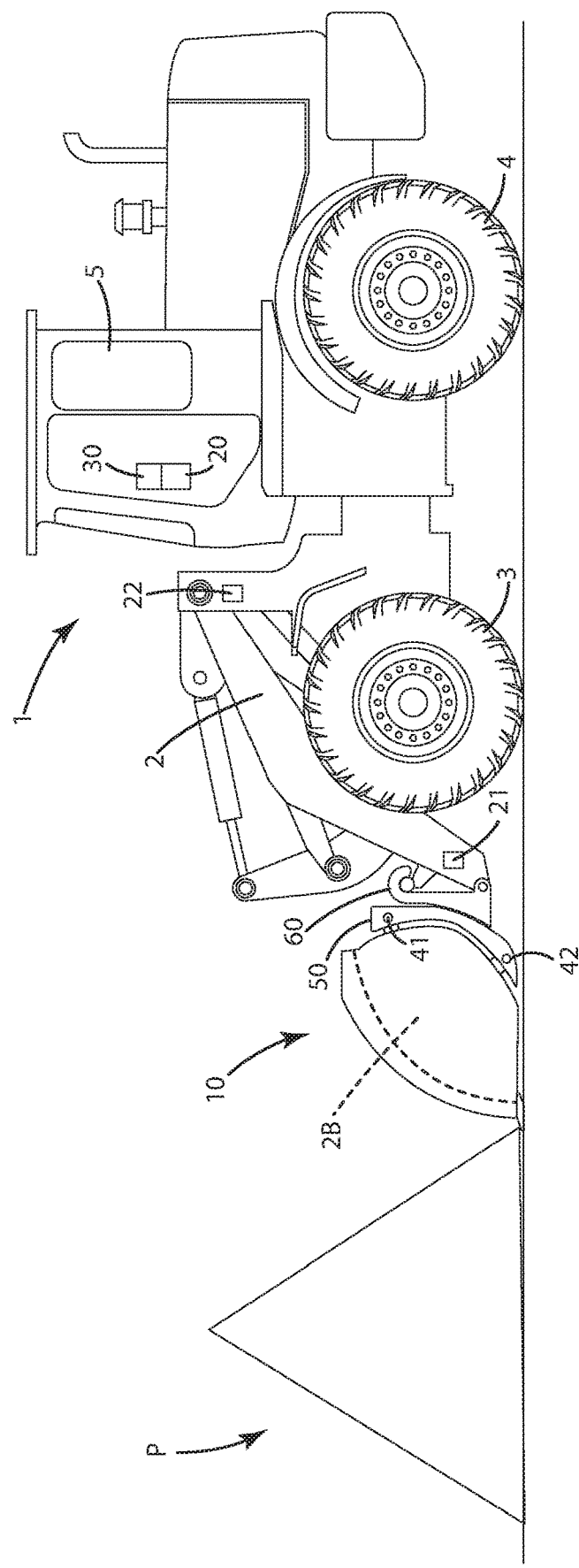
FIG. 3 is another perspective view of the load sensor bucket with more material being added thereto so as to achieve a target load amount based on previous feedback from the load sensors.
Figure 4:
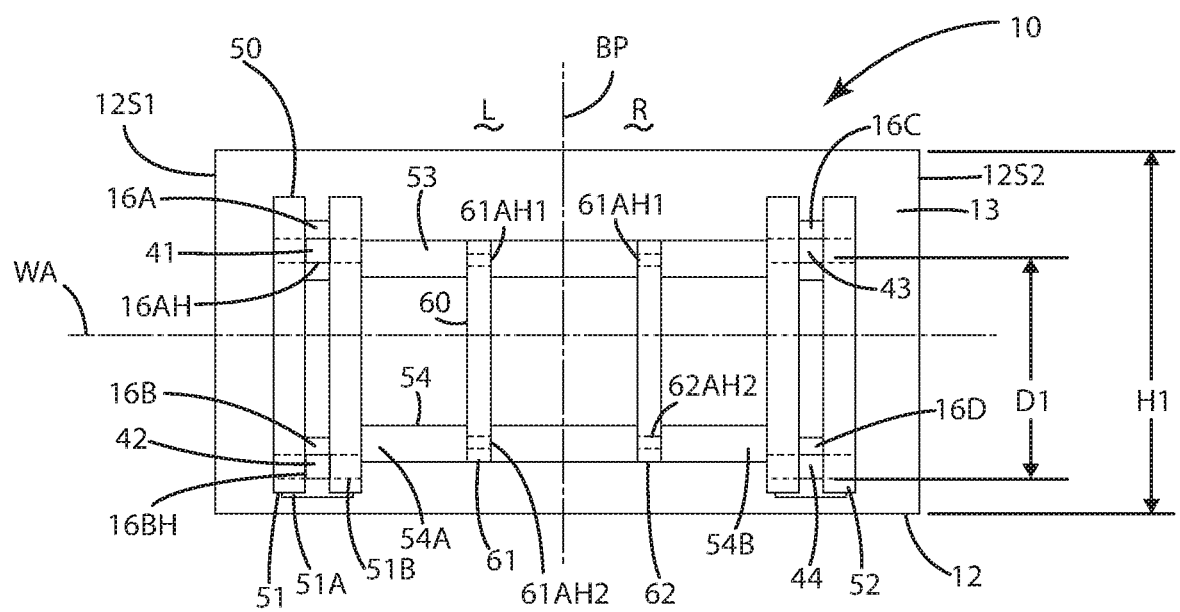
FIG. 4 is a rear view of the load sensor bucket.

With reference to FIGS. 1-4, the bucket 10 and its particular features will now be described in further detail. The bucket can include a floor 12 and a rear wall 13, which can join with one another at a lower transition 12T. The bucket 10 can include first and second opposing side walls 12S1 and 12S2. The bucket can have a width axis WA that extends across the width of the bucket 10 from one side wall to the other. The width of the bucket can be optionally at least 2 feet, at least 3 feet, at least 4 feet, at least 5 feet, at least 6 feet, at least 8 feet, at least 10 feet or between 6 feet and 10 feet, inclusive. Optionally, the width of the loader bucket can be at least as wide as the width of the loader at its tires or tracks, extending from an outer surface of one tire or track on one side to an opposite tire or track on another side of the loader. The bucket can include a bisecting plane BP that is perpendicular to the width axis WA and which divides the bucket 10 into left L and right R sides, as shown in FIG. 4.

The bucket can include multiple ears or tabs that join the bucket to the load frame 50 in a fixed manner. As illustrated, these ears can include a first upper ear 16A joined with the rear wall on the left side, a first lower ear 16B joined with the rear wall on the left side, below the first upper ear, closer to the floor, a second upper ear 16C joined with the rear wall on the left side, and a second lower ear 16D joined with the rear wall on the left side, below the second upper ear, closer to the floor.

Each of the respective ears can define a respective ear hole. For example, the first upper ear 16A can define a first upper ear hole 16AH, and the first lower ear can define a first lower ear hole 16BH. These ear holes, and the other ear holes on the opposite side of the plane BP, can be spaced from one another a preselected distance D1. This distance D1 can correspond to the geometric centers of the respective ear holes in the upper and lower ears. This distance D1 can be less than the vertical height H1 of the bucket 10, taken from a horizontal surface of the floor to the uppermost portion of the bucket. This distance can be selected so that the associated load sensors are particularly spaced from one another to form a vertical metering column VMC as described below. Optionally, to achieve this, the height H1 can have a particular relationship or ratio relative to the preselected distance D1. For example, the ratio of the height H1 to the distance D1 (H1:D1) can be optionally less than 3:1, less than 2:1, or between 1:1 and 2:1.

Each of the ears can be in the form of a projection that is welded or otherwise securely fastened or secured to the rear wall of the bucket 10. These ears can be spaced so that they fit between adjacent portions of the load frame, so the ears can be connected to the load frame 50. For example, the load frame 50 can include a first lateral arm 51 disposed on the right side R which can extend generally vertically downward along the rear wall 13 toward the floor 12, but spaced a distance from that rear wall 13. The load frame 50 can include a second lateral arm disposed on the left side L that can extend generally vertically downward along the rear wall 13 toward the floor 12. Each of these respective first and second lateral arms can be substantially identical so only one will be described here. For example, the first lateral arm 51 can include a first arm portion or plate 51A and a second arm portion or plate 51B. These arm portions can be curvilinear plates that extend downwardly along the rear wall, generally following the curved contour of the rear wall. These plates can be welded to one another or otherwise joined by cross members to complete the first lateral arm.

As shown in FIG. 5, the plates can be spaced a distance D2 from one another. This distance can be sufficient such that an ear, for example the ear 16A, can be located between the plates, fitting tightly therebetween. Each of the plates can define respective holes that are aligned with one another. For example, the first plate 51A can define a first hole 51AH1 and the second plate 51B can define a second hole 51BH2. These holes can be aligned with one another along a sensor axis SA. These holes can further align with a hole 16AH defined by the ear 16A. As shown in FIG. 5, the first load sensor 41 can be in the form of a pin and can project through the first hole 51AH1, the ear hole 16AH and the second hole 51BH2 of the respective load frame, lateral arm and ear. The first lateral arm can include similar holes and a similarly situated load sensor associated with the lower first lower ear 16B. Likewise, the second lateral arm can include similar holes and similarly situated load sensors associated with the second upper and lower ears on the opposite side of the bisecting plane BP.

Optionally, when the load frame is attached to the ears via the load sensors and/or other bolts or fasteners, the load frame cannot be removed from the bucket without the use of tools. Similarly, the quick coupler described below can be fixedly joined with a load frame such that the load frame cannot be removed from the quick coupler without the use of tools. The quick coupler, however, can connect to the machine, for example its boom, without the use of tools.

The frame 50, as shown in FIG. 4 can include an upper crossbar 53 and a lower crossbar 54. The lower cross bar 54 can include a first lower bar end 54A and a second lower bar end 54B. The first lower bar end 54A can be joined with the first lateral arm 51 on the left side L, and the second lower bar end 54B can be joined with the second lateral arm 52 on the right side R of the bisecting plane BP. The upper crossbar 53 can include similar first and second ends, joined with the respective first and second lateral arms on opposing sides of the bisecting plane, but above the lower cross bar.

The bucket 10 can include a quick coupler 60 as shown in FIGS. 1 and 4. The quick coupler can be joined with the load frame 50. The quick coupler can be configured to quickly attach and detach the bucket to and from the machine and in particular the boom. This attachment and detachment of the quick coupler can be performed by a user with or without the use of tools. For example, the quick coupler can utilize a sliding pin, hinges, or other mechanism to quickly attach the coupler to the machine. As shown in FIG. 4, the quick coupler can be joined directly to the upper crossbar 53 and the lower crossbar 54 of the load frame 50. The coupler can be disposed inwardly from those arms, closer to the bisecting plane BP than both of those arms. The quick coupler can be joined with the upper and lower crossbars of the load frame between the first and second lateral arms 51 and 52. The respective first and second lateral arms 51 and 52 can be disposed laterally outward, farther from the bisecting plane BP, than the first 61 and second 62 plates of the coupler 60.

The quick coupler 60 can define one or more pin recesses in the plates. These pin recesses can be used to couple a pin or bar, associated with the arms or boom of the machine, to that coupler, and thus attach the bucket 10 to the machine. In particular, the coupler can include the first 61 and second 62 plates. These plates can define pin recesses, which can be in the form of recesses, holes, apertures, slots, or the like. These pin recesses can be similar on the first plate and the second plate and therefore only the first plate 61 will be described. The pin recesses can include a first pin recess 61AH1 and a second pin recess 61AH2 disposed below the first pin recess. These pin recesses can be disposed laterally inward from the arms 51 and 52 of the load frame 50. Optionally, all of the pin recesses 61AH1, 61AH2, 62AH1 and 62AH2 can be disposed inwardly, closer to the bisecting plane BP, than each of the respective first lateral arm 51 and second lateral arm 52 and their corresponding sensor holes, as well as the ears and the respective sensor holes in those ears. Optionally, all of the respective sensor holes in the load frame and/or the ears are distal from and laterally outwardly displaced relative to the bisecting plane BP from the respective pin recesses of the quick coupler 60.

Although shown as including four pin recesses on the first and second plates 61 and 62, the quick coupler 60 can be set up in other configurations to join with the load frame 50. In some cases, the quick coupler can form a portion of the load frame and can interact directly with the load sensors. As shown, however, the quick coupler optionally is distal from all of the load sensors 40, and does not otherwise directly engage those load sensors with any portion or component of the quick coupler.

The load sensors 40 can be interposed between the load frame 50 and the bucket, for example, between the load frame and the respective ears. As mentioned above, the load sensors can extend through holes defined by the respective first and second lateral arms as well as respective upper and lower ears on each side of the bisecting plane BP. In one example shown in FIG. 5, the first load sensor 41 can be in the form of a first pin. The first upper ear 16A can define a first upper ear hole 16AH. The first pin 16A can be disposed in the first lateral arm 51 upper holes 51AH1 and 51BH2 of the respective plates 51A and 51B of the lateral arm 51. The second load sensor 42 also can be in the form of a second pin. The first lower ear 42 can define a corresponding first lower ear hole. The second pin load sensor 42 can be disposed in the first lateral arm lower hole and in the first lower ear hole. These first and second load sensors 41 and 42 can be disposed on the left side L of the bisecting plane BP, outward from and distal from the coupler. The distance D1 between these first and second pins, as described above, can have a relationship relative to the height H1. The third 43 and fourth 44 load sensors also can be in the form of respective pins disposed in respective ear holes of the respective second upper and second lower ears, as well as corresponding holes defined by the second lateral arm and its respective plates.

Each of the load sensors 40 can be configured to detect one or more forces exerted on the load sensor. For example, the load sensors can be configured to detect stress and/or strain at locations between the load frame and the ears joined with the rear wall of the bucket. The load sensors can be in the form of load measuring pins that can sense forces applied via stress or strain gauges installed within a bore through a center or other location of the pin. As shown in FIG. 5, a representative first load sensor 41 can determine the strain S5 experienced by that load sensor under force F1 generated by the ear 16A and corresponding forces F2 to generated by the plates 51A and 51B of the first lateral arm 51. The gauge 41G can be a strain gauge in this particular example. The strain gauge 41G can detect and/or take a measurement of strain and/or stress associated with the force F1 and/or the forces F2. This measurement detection can produce a signal, which can be communicated via a transmitter or receiver associated with the controller 20. As shown, the signal can be transmitted via a wireless communication, such as Wi-Fi or Bluetooth. Of course, the sensors can be in communication with the controller via hard wires to transmit the signal associated with the forces. Generally, each of the load sensors are in communication with the controller 20 which is in further communication with the display or user interface 30. This user interface can be disposed within an operator's field of view in the cab 5. Each of the loads sensors can be configured to communicate the signal to the controller. This signal can be indicative of the load of material in the bucket 10 when the bucket is in a metering mode, as described below. Some suitable load sensors can include load pins that are commercially available from LCM Systems LTD, of Newport Isle of Wight, United Kingdom, or load pins that are commercially available from Strainsert Company of West Conshohocken, Pa., USA.

Operation of the load sensor bucket 10 will now be described with reference to FIGS. 1-5. If the load sensor bucket 10 is not attached to the machine 1, the operator can move the machine toward the bucket to engage it with the quick coupler 60. The quick coupler 60 can be coupled to the machine to secure the bucket to the machine. Where the quick coupler utilizes manually installed pins, the operator can install those pins. Where the pins are automated, the operator can operate a control to install the pins in the respective pin recesses of the quick coupler to secure the bucket to the machine. Generally, in both of these operations, the quick coupler can be quickly attached to the machine without the use of tools.

With the bucket 10 attached to the machine 1, the operator can select a particular loading job or loading cycle via the user interface 30. The user can do so via the switch 25. The user can optionally select one of a number of prestored loading jobs. An exemplary loading job can be associated with an amount of feedstock to be moved from one location on a farm to another location on a farm, where it can be mixed in a mixer with other feed additives to provide feedstock to livestock in a feeding operation. As shown in FIG. 5, the exemplary job can require twenty particular loads having specific target amounts, for example, a target weight, volume, or other physical features. The user can occasionally view the status of the bucket and of the total job throughout the loading cycle on the display 30.

During the load cycle and transport of the material from the pile P, the operator can operate the machine so as to move the bucket 10 of the machine 1 into the pile P of material. The bucket can capture a first bucket load 1B of the material. The first bucket load 1B can include a center of mass 1COM as shown in FIG. 2. The bucket 10 can be rotated in direction R about an axis A1 (FIG. 1) and/or an axis A2 (FIG. 2). This can effectively tilt the bucket 10 with the load of material 1B loaded in it to a preselected angle A4 or orientation relative to a horizontal ground surface and/or angle A5 relative to a horizontal plane HP. This center of mass 1COM of the load can be located in the vertical metering column VMC. Due to the load in the bucket, the weight of that load is transferred to the load sensors, for example, the load sensors 41, 42, 43 and 44. The force F1 from the bucket creates a stress and/or strain S5 in the load sensor 41 as shown in FIG. 5. Corresponding forces F2 are exerted by the associated lateral arms of the bucket. The load sensors detect this stress or strain and generate a corresponding signal. The signal can be communicated to the controller 20. The controller 20 can process the signals and calculate the current load of the material in the first bucket load, for example, in pounds, kilograms, tons, yards, cubic meters, or other units of measurement. The controller can display the current load 37 or the display 30. The controller can compare the current load to the target load 37 of material, which again can correspond to a particular amount, weight and/or volume of the material. The controller can, in response, display the status of the loading of the bucket in a status field 38. As shown there, a reload is required to achieve the target load based on the current load detected by the load sensors. The operator of the machine can then determine whether the first measurement of the current load does or does not correspond to the target load or target amount of the material, for example, by comparing the displayed values on the display. Generally, the operator can determine whether the first measurement and the corresponding measured load is at least as great as a target load of material by viewing the output, for example, the alphanumeric data output on the display 30.

If the first measurement indicates that the first bucket load 1B does not correspond to the target amount of material, the operator can take further action for a reload of the bucket. For example, the operator can move the bucket 10 into the pile P again to add more material from the pile P to the first bucket load of material, thereby forming a second bucket load of material 2B as shown in FIG. 3. The operator can again tilt the bucket about one or more of the axes A1 or A2 to the angle A4, A5, or some other orientation. The weight of the second bucket load of material 2B or some other load parameter can again be detected by the load sensors 40 to generate second signals indicative of a second measurement of that second bucket load. The controller can utilize the second signal and can display new output on the user interface or display 30 associated with the second signals. Assuming the load has increased by the addition of material, the current load 37 in FIG. 5 can read approximately 900 pounds, give or take 50 to 100 pounds, or some other acceptable deviation. The operator can then confirm that the second measurement does correspond to the target load or target amount of material. Thereafter, the operator can operate the machine to move the second bucket load 2B of material to another location distal from the pile. For example, the load can be dumped into a mixer or other container of an operation. Optionally, the operator can determine whether the second measured load is at least as great as the target load of material by viewing the output, such as the alphanumeric data on display 30.

The load sensor bucket 10 can be selectively rotatable and/or tiltable about one or more of the axes A1 and A2 to one or more of a loading mode and a metering mode. The loading mode is generally illustrated in FIGS. 1 and 3. There, the bucket 10 is disposed such that the floor 12 is substantially parallel to the ground surface GS. The bucket can be moved into a pile P of material to capture a bucket load of that material. Optionally, by substantially parallel, it is meant that the floor can be tilted between 0° and 20° relative to the ground surface so as to better capture and scoop material the bucket 10. Generally, the loading mode can be such that the orientation of the bucket is conducive to moving the bucket into a pile or supply of material such that the material enters the bucket.

The load sensor bucket 10 also is operable in the metering mode as mentioned above. In this metering mode, the bucket 10 can be disposed such that the floor 12 is tilted upward to a preselected angle A4 relative to the ground surface GS, and/or preselected angle A5 relative to the horizontal plane HP. Optionally, the ground surface GS can be a substantially horizontal ground surface. This tilting again can be performed by lifting the boom 2 upward as shown in FIG. 2 or tilting the bucket upward using a tilt actuator as described above, without necessarily lifting the bucket to such an elevation or height.

In the metering mode, the first 41, second 42, third 43, and fourth 44 load sensors are oriented to form a vertical metering column VMC that is substantially perpendicular to the ground surface GS, which again can be a horizontal ground surface. With this vertical metering column VMC substantially perpendicular to the horizontal ground surface or to the horizontal plane HP, the vertical metering column VMC can have a polygonal tubular shape, with a polygon being formed in the horizontal plane HP taken through the column as shown in FIG. 2. There, the horizontal plane HP projects out of the plane of that figure. Each of the load sensors 41, 42, 43 and 44 can have the broken lines projected downward from their centers to the ground surface GS and through the horizontal plane HP. The intersection of that vertical metering column VMC and the horizontal plane HP can be in the shape of a polygon, and optionally a rectangle. In this configuration, each of the load sensors 41, 42, 43 and 44 and can form a corner of the rectangular shape of the vertical metering column VMC. Of course, where the load sensors are not laid out in a rectangular configuration relative to one another (FIG. 4), and instead are in some other polygonal configuration, such as a triangle, with only three sensors, then that vertical metering column can be of that alternative polygonal tubular shape.

Regardless of the cross-sectional shape of the vertical metering column VMC, the bucket 10 generally orients a center of mass 1COM of the material within the vertical metering column VMC. As an example, the mass 1COM is disposed between the broken lines in FIG. 2. This center of mass also can be disposed within the width W of the bucket, between its sides. In this manner, the load sensors 41-44 can adequately measure the load of material in the bucket 10 to generate signals indicative of the forces exerted by the bucket on the load frame and load sensors. Again, these signals can be processed by the controller to output measurements and/or information indicative of the status of the loading of the bucket, to assist the operator in maximizing efficiency and loading of the bucket to a target amount or load.

Figure 7:
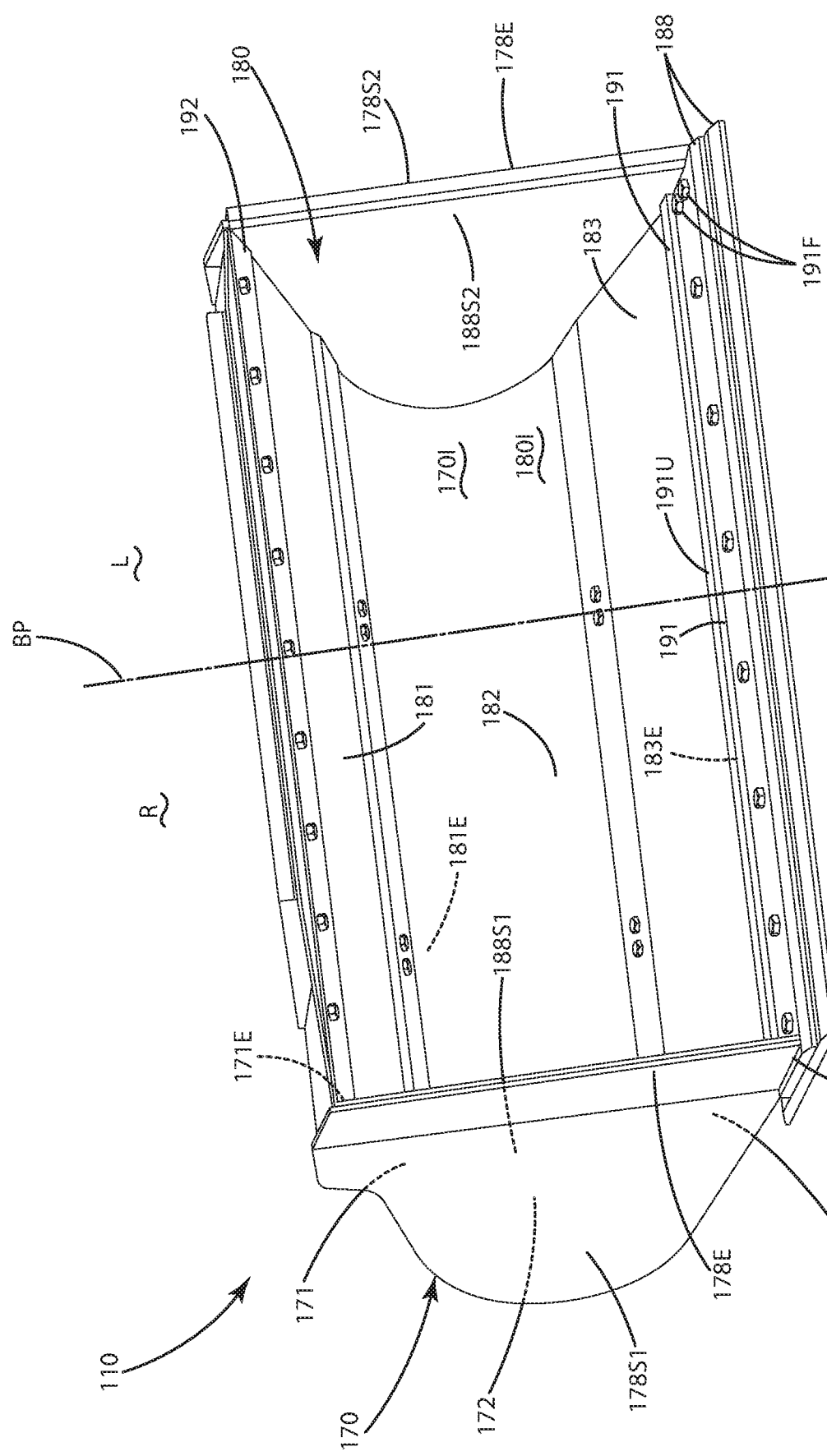
FIG. 7 is a perspective view of a first alternative embodiment of the load sensor bucket including an inner bucket and an outer bucket.
Figure 8:
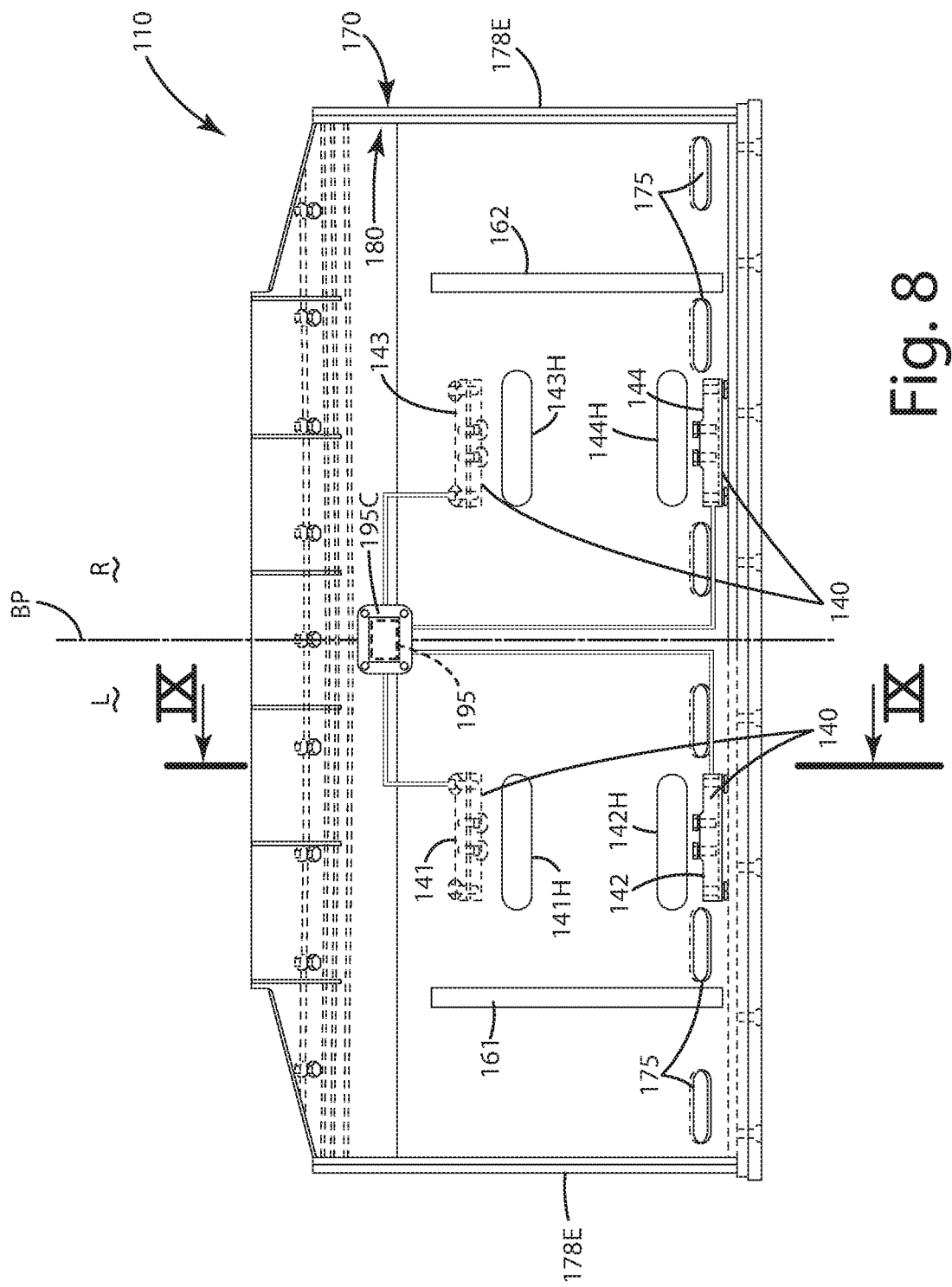
FIG. 8 is a rear view of the load sensor bucket showing drain holes.

A first alternative embodiment of the bucket is shown in FIGS. 7-11 and generally designated 110. The bucket of this embodiment can be similar and/or virtually identical to the embodiment described above in structure, operation and function with several exceptions. For example, the bucket 110 can include a quick coupler 160. The quick coupler can be configured to quickly attach and detach the bucket to and from the machine and in particular the boom. This attachment and detachment of the quick coupler can be performed by a user with or without the use of tools. For example, the quick coupler can utilize a sliding pin, hinges, or other mechanism to quickly attach the coupler to the machine. As shown in FIG. 4, the quick coupler can be joined directly to the exterior surface, or the outer bucket exterior or rear surface 174. The coupler can include one or more plates 161 and 162 disposed outward and opposing one another across the bisecting plane BP. These plates as shown in FIG. 8 can be disposed laterally outward or generally distal from the respective load sensors 140 as described below. Optionally, although not shown, these plates can be disposed directly over and can overlap each of the respective load sensors on opposing sides of the bisecting plane BP. The quick coupler 60 can define one or more pin recesses in the plates. These pin recesses can be used to couple a pin or bar, associated with the arms or boom of the machine, to that coupler, and thus attach the bucket 110 to the machine as described in connection with the embodiment above.

The bucket 110 of the embodiment shown in FIGS. 7-11 can include an outer bucket 170 and inner bucket 180 nested at least partially within the outer bucket 170. The outer bucket 170 can be joined with the quick coupler 160 as described above. The outer bucket 170 can include an outer bucket rear wall 171, an outer bucket transition wall 172 and an outer bucket floor 173. The transition wall 172 can be joined with and extend into the respective rear wall 171 and the floor 173. These components can be integrated with one another and formed as a unitary structure. The transition wall can be generally curved, angled, rounded or of a polygonal shape, and can join the respective floor and rear walls of the outer bucket. Optionally, the quick coupler 160 can be joined to the exterior surface 174 of the outer bucket adjacent the transition wall 172. The rear wall 171 can extend upwardly and terminate at an outer bucket upper edge 171 E. The floor can extend forwardly and terminate at an outer bucket lower edge 173 E. Cooperatively, the rear wall 171, transition wall 172 and floor 173 can define an outer bucket interior compartment 170 I, within which the inner bucket 180 can be at least partially disposed as described below.

Figure 9:
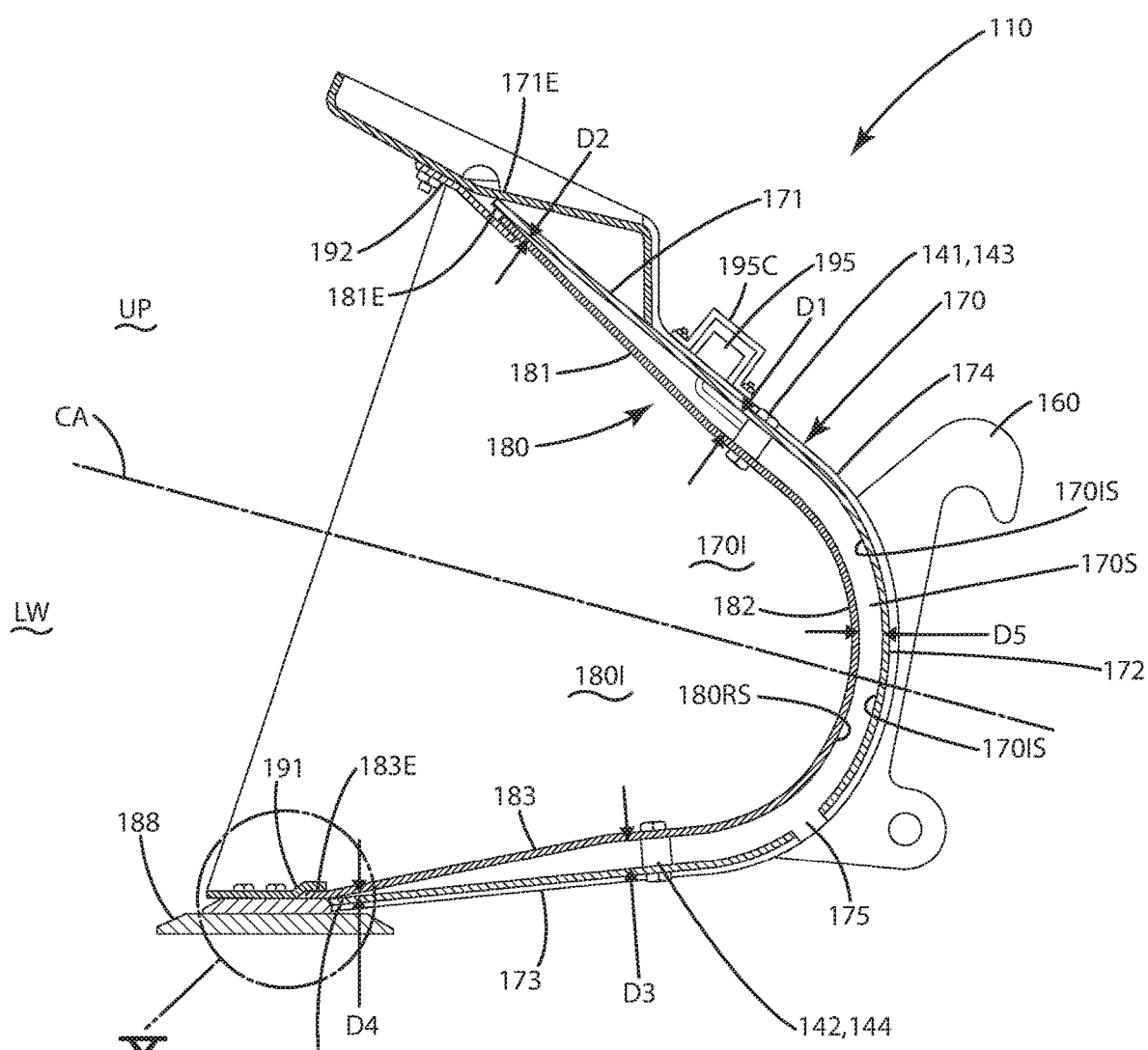
FIG. 9 is a section view of the load sensor bucket taken along line 9-9 of FIG. 8.
Figure 11:
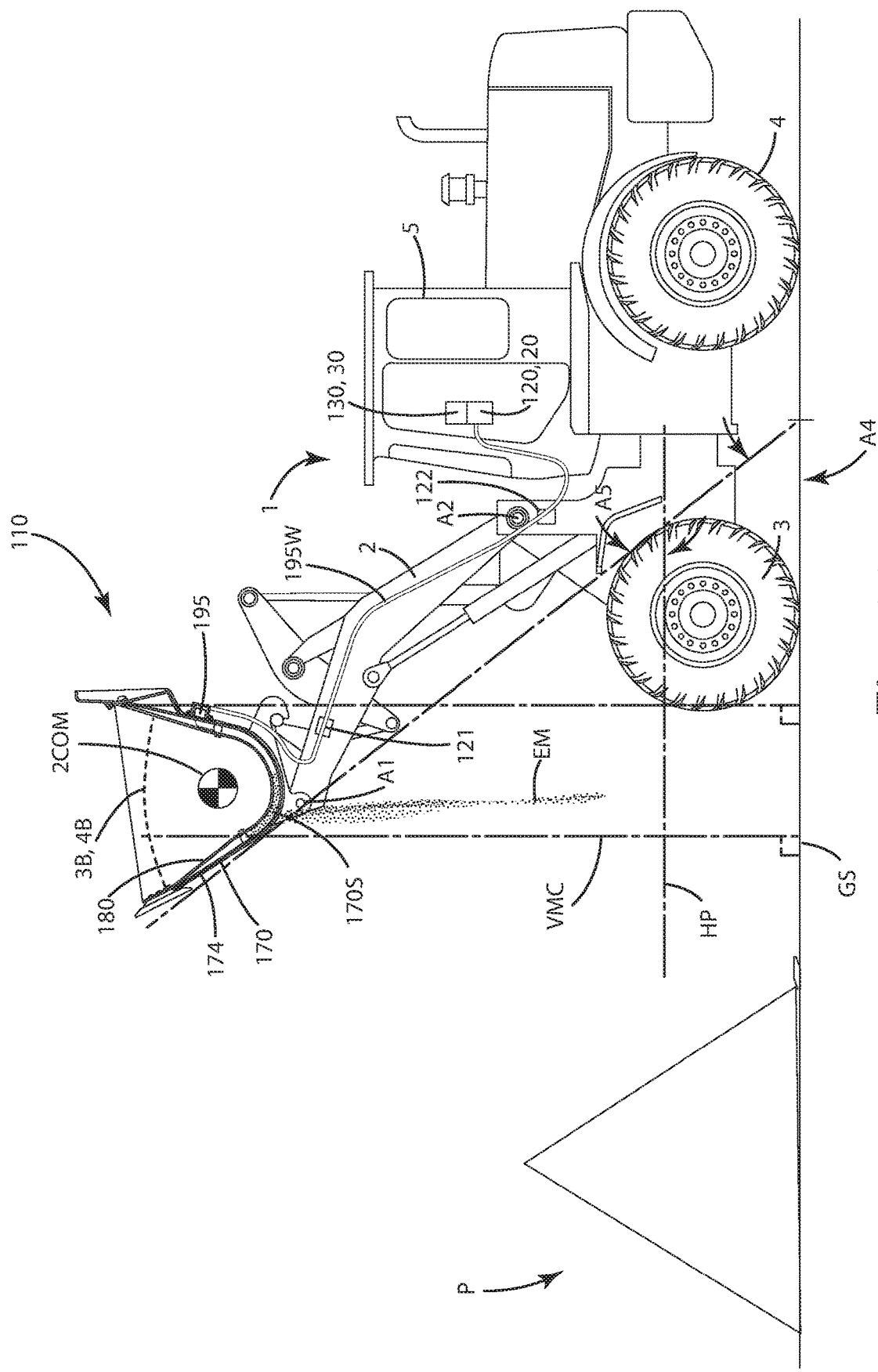
FIG. 11 is a perspective view of the load sensor bucket of the first alternative embodiment on a machine tilted upward with the bucket loaded and positioned so that load sensors produce a vertical metering column within which a center of mass of the load is located.

The outer bucket optionally can define a plurality of drain holes 175 as shown in FIGS. 8 and 9. The drain holes can be disposed below and/or adjacent the plates 161, 162 of the quick coupler 160. These drain holes can be of an elongated shape having rounded edges. In other construction, they can be of elliptical, circular or polygonal shapes. The drain holes 175 can be disposed in the lower portion of the outer bucket transition wall 172, and can open into the space 170 S that is defined between the outer bucket 170 and the inner bucket 180 as described below. The drain holes can extend on both sides of the bisecting plane BP across the width of the bucket 110. The drain holes can be closer to the floor 173 than the rear wall 171 of the outer bucket. The drain holes can be disposed between the upper load sensors 141, 143 and the lower load sensors 142, 144. Several of the drain holes can be disposed between the respective load sensors on the left and right sides of the bucket. Optionally, the drain holes 175 can be configured such that when the bucket 110 is tilted as shown in FIG. 11, material that may have entered the space 170 S between the outer bucket 170 and the inner bucket 180 will drop out of the space, through the drain holes as shown there. This can prevent or impair (both of which can be commonly referred to as "impair" herein), excess material from conglomerating in or becoming disposed between the inner and outer buckets, which may alter the ability of the load sensors to adequately sense and detect a load in the inner bucket as described below. As an example, material between the inner and outer buckets, in this space, can transfer part of the weight or forces of a load in the inner bucket through the material in this space, and to the outer bucket. Accordingly, the forces of stress and/or strain throughout the load sensors is reduced or altered such that the load sensors do not adequately sense or measure the actual load in the inner bucket, because that load is transferred through the material in the space between the buckets rather than the load sensors.

Although shown generally in the lower part of the transition wall 172, the drain holes 175 optionally can be disposed in the other parts of the outer bucket 170. For example, although shown below the bucket central axis or plane CA of the bucket 110 (which generally divides the bucket 110 into same sized or proportioned upper section UP and lower section LW), the drain holes 175 can be disposed in the upper section instead of the lower section. In other cases, multiple drain holes can be disposed in both the upper UP and lower LW sections of the bucket. In some cases, the drain holes 175 can be defined by the outer bucket along the central axis or plane CA in the outer bucket exterior surface 174.

With reference to FIGS. 7-8, the outer bucket 170 can include side plates 178S1 and 178S2, which can be joined to the respective rear wall 171, transition wall 172 and floor 173 of the outer bucket, generally forming an outer bucket shell. These side plates can terminate at respective side plate front edges 178E associated with the respective side plates on the left L and right R sides of the bisecting plane BP.

The bucket 110 optionally can include one or more wear plates 188 that are disposed below and attached to the outer bucket and/or the inner bucket. As shown in FIGS. 7-10, these wear plates 188 can be angled at a forward portion so that material will naturally flow upward and into the inner bucket 180. The wear plates can be constructed from a different material from the remainder of the bucket. As an example, these plates can be constructed from carbide, titanium, or other extremely wear resistant materials, as this the wear plates repeatedly engage the ground surface, which can be cement, when the bucket is in use and collecting material.

The bucket 110 as mentioned above can include an inner bucket 180 that is disposed at least partially within the interior compartment 1701 of the outer bucket 170. As shown in FIGS. 7-9, the inner bucket 180 can include an inner bucket rear wall 181 that transitions to an inner bucket transition wall 182 which joins with an inner bucket floor 183. Each of these respective walls can be adjacent and or spaced from the respective outer bucket rear wall 171, outer bucket transition wall 172 and outer bucket floor 173 of the outer bucket 170. Due to this spacing, a space 170S can be formed between the respective inner bucket 180 and outer bucket 170. The space 170S can be formed between the inner bucket rear surface 180RS and the outer bucket interior surface 1701S. The space 170S can be of varying depths or thicknesses, depending on the walls between which it extends as described below. The inner bucket 180 also can include side plates 188 S1 and 188 S2. The side plates can be parallel to the respective side plates 178 S1 and 178 S2 of the outer bucket 170, and inwardly set relative to the same.

As shown in FIG. 9, the inner bucket rear wall 181 can extend forwardly to an inner bucket upper edge 181E. The inner bucket floor 183 can extend forwardly to an inner bucket lower edge 183E. These upper and lower edges of the inner bucket can terminate adjacent, short of, or beyond the respective upper and lower edges of the outer bucket. As they extend forwardly, toward the respective upper and lower edges, the inner bucket rear wall 181 and floor 183 can flare or taper outward, away from the central axis or plane CA. In extending away from the transition wall 182, generally in the region near the upper load sensors 141, 143, the rear wall 181 can become closer to the outer bucket rear wall 171. Near the transition wall 182, 172, the inner bucket rear wall 181 can be a first distance D1 from the outer bucket rear wall 171. Near the edge 181E, the inner bucket rear wall 181 can be a second distance D2 from the outer bucket rear wall 171. This distance D2 can be less than the distance D1, or the distance D1 can be greater than the second distance D2. In some cases, the distance D2 can be zero, with the inner bucket upper edge 181E engaging the interior surface 170IS of the rear wall 171 near the edge 171E. In other cases, these distances can be slightly greater. D2, for example, optionally can be between 0.01 mm and 10 mm, inclusive. As shown in FIG. 9, where the inner bucket rear wall 181 transitions upward to the edge 181E, that rear wall 181 can angle, curve, flare and/or otherwise transition or taper more toward the outer bucket rear wall 171, away from the central axis or plane CA. Thus, the space 170S between the inner rear wall and the outer rear wall becomes smaller toward the upper edge of the respective rear walls. Optionally, between the upper sensors 141, 143 and the lower sensors 142, 144, the space 170S between the outer bucket transition wall 172 and the inner bucket transition wall 182 can be uniform. For example, the distance between the outer bucket interior surface 170IS and the inner bucket rear surface 180RS can be a uniform distance D5. The distance D5 can be less than the distance D2 mentioned above and another distance D4 detailed below.

The inner bucket floor 183 can curve, angle and/or flare outward generally away from the central axis or plane CA, generally toward the outer bucket floor 173 as also shown in FIG. 9. There, the distance between the inner bucket floor 183 decreases from a greater distance D3 adjacent the lower load sensors 142, 144, to a lesser distance D4 near the lower edges 173E and 183E of the respective buckets. The third distance D3 can be greater than the fourth distance D4, near the edge and likewise, the fourth distance D4 can be less than the third distance D3 near the lower edges of the respective inner and outer buckets. Again, the inner bucket lower edge 183E can be optionally adjacent, engaging and/or near the outer bucket lower edge 173E.

Optionally, the lower and upper edges 183E, 181E of the inner bucket 180 can be concealed, protected or otherwise overlapped by cover plates 191 and 192. For example the lower cover plate 191 can extend over the forwardmost portion of the inner bucket lower edge 183E. Likewise, the upper cover plate 192 can extend over the forwardmost portion of the inner bucket upper edge 181E. This overlap can prevent material from jamming between the inner bucket floor 183 and the outer bucket floor 173, or between the inner bucket rear wall 181 and the outer bucket rear wall 171. In turn, this material, when impaired from entering the space 170S between the inner bucket and the outer bucket, can reduce the likelihood that the material interferes with the load sensing via the respective load sensors 140 of the bucket 110.

Figure 10:
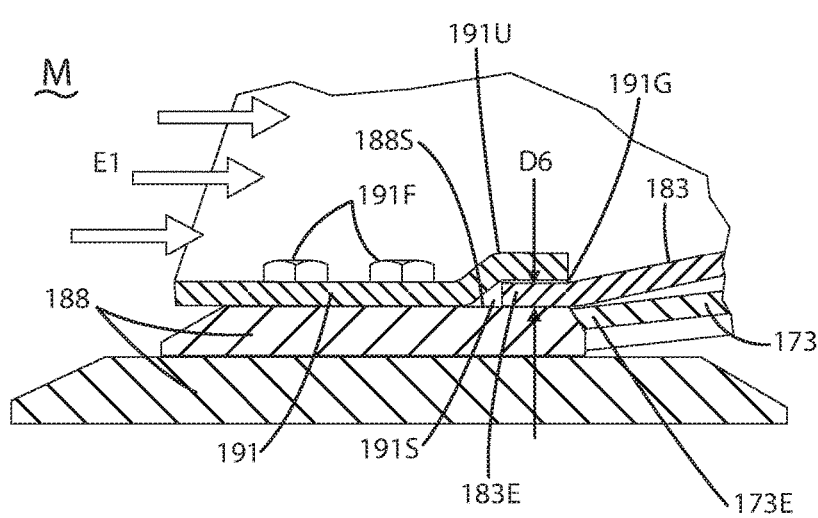
FIG. 10 is a close up view taken from FIG. 9.

A particular construction of the cover plates is shown in the detail of FIG. 10. There, the outer bucket floor 173 terminates at an outer bucket floor lower edge 173E. That lower edge 173E and generally the bucket floor 173 can be joined with one or both of the wear plates 188. The cover plate 191 can be fastened with fasteners 191F to the wear plates 188. This cover plate can include an upwardly bent or extending portion 191U that is spaced a distance D6 from an upper surface 188S of wear plate 188. In turn, this creates a slot or gap 191S. The edge 183E and/or a portion of the inner bucket floor 193 can extend into the space 191S such that the edge lower edge 183E is concealed from view and generally protected so that material moving in direction M and entering the inner bucket in direction E1 does not go under the lower edge, between the inner and outer bucket floors.

In some cases, the cover plates or bucket edges can be associated with a gasket 191G. This gasket 191G can be disposed in the space 191S and can interface with the portion of the inner bucket floor 183 near the edge 183E. This gasket 191G can be constructed from a composite, a rubber, metal, or other material depending on the application. Generally, when a polymer, this gasket can be constructed from ultra high molecular weight polyethylene, high density polyethylene, polypropylene, and other wear resistant and/or low friction materials. The gasket 191G can be disposed above and below the end of the plate, near the edge to further reduce friction and/or enhance movement of that plate, and otherwise prevent material from entering between the floor 183 of the inner bucket and the floor 173 of the outer bucket. This gasket 191G can prevent friction between the plate 191 and the edge of the inner bucket floor 183, so that the inner bucket freely slides and is satisfactorily suspended in the outer bucket via primarily only the load sensors 140. In this manner, when the load sensors 140 undergo a stress or strain due to the weight of material in the bucket when the bucket is tilted as shown in FIG. 11, the cover plates protecting the edges of the inner bucket do not interfere with the translation and detection of that weight by the load sensors 140. Optionally, with the gasket in place, even when the cover plates are slightly bent toward the edges of the inner bucket, they do not prevent the inner bucket from moving slightly such that the load sensors can sense the inherent stress and/or strain transferred by the material to those load sensors.

With reference to FIG. 9, the upper cover plate 192 can be joined with the upper edge or a portion of the bucket near the upper edge 171E of the rearward wall 171 of the outer bucket. The cover plate 192 can be disposed over or overlap the upper edge 181E of the inner bucket 180 and can function in a similar manner as the cover plate 191. Further, the cover plate 192 can include a gasket similar to the one mentioned in connection with the lower edge of the inner bucket to prevent material from entering between the inner and outer bucket and/or generally provide low friction or friction free movement between the edges of the inner and outer buckets in this area.

The bucket 110 of this embodiment can include a plurality of load sensors 140, namely first 141, second 142, third 143 and fourth 144 load sensors. These load sensors can be similar to the type of load sensor described above in the embodiment above. These load sensors can be in the form of elongated bars that are disposed between the inner bucket and outer bucket. Optionally, these load sensors can be in the form of 2 inch×2 inch×12 inch load bars. As shown in FIG. 9, the load sensors 140 can be disposed between the inner bucket and the outer bucket. The upper load sensors 141 and 143 can be disposed between the respective transition walls 172 and 182 of the inner and outer buckets. Forward of those load sensors, the inner bucket rear wall 181 can start to flare outward from the central axis or plane CA and generally extend or angle toward the rear wall 171 of the outer bucket. The load sensors 140 can be in the form of elongated load bars that are held in place by one or more fasteners such that the load sensors are securely fastened or fixed to both the inner bucket and the outer bucket. Similarly, the lower load sensors 142 and 144 can be disposed between the inner bucket and the outer bucket, generally between the lower portions of the respective transition walls 172 and 182 of the outer and inner buckets. Forward of those load sensors, the inner bucket floor 183 can start to flare outward, away from the central axis or plane CA, and can extend or angle toward the floor 173 of the outer bucket 170.

As shown in FIG. 8, the load sensors optionally can be hardwired to a controller 195 that is associated with the bucket 110. Optionally, this controller can be encased in a metal casing 195C that is secured to the outer bucket exterior surface 174, for example with fasteners. This casing 195C can be removed from the bucket 110, in particular the outer bucket, to access the controller 195 therein to service it and/or calibrate it. In some cases, there can be debris and waterproof connections, ports or other access areas so that a computer or other device can be plugged into the controller to transfer data, commands or other information to or from the controller to assist in its control of the load cells and transmission and receipt of data to or from those load cells relative to the controller and display in the machine 1, which can be identical to the machine mentioned above. Likewise, the controller 120 and its display 130 can be identical to the controller 20 and display 30 of the embodiment above. Optionally, due to the encasing of the controller 195 in a durable optionally metal, plastic or composite protective box or case 195C, which box may prevent wireless communication therethrough, in the current embodiment, the controller 195 can be wired with hardwire 195W (FIG. 11) to the controller 120, 20 in the cab 5 of machine 1. This hardwire 195W also can provide power to the controller 195 on the bucket and optionally to the load sensors depending on the application.

In some cases, the controller 195 can include a data port so that a computer or other device can be plugged into the controller to perform diagnostics, to calibrate the load sensors and/or the controller in general. Optionally, the controller and load sensors can be pre-calibrated by a manufacturer. In addition to collecting sensed data and related signals from the respective load sensors 140, the controller 195 can transfer that sensed data or signals to the other controller 120 in the cab of the machine so that output can be displayed on the display 130, similar to the embodiment described above. The controller 195 can be in communication with a tilt sensor 121 and a lift sensor 122, which can be identical to those sensors described in this embodiment above. One or both controllers 195, 120, can process data from the tilt and/or lift sensors to trigger when the load sensors 140 capture load data regarding material in the inner bucket. In the embodiment shown, the controller 195 can sense when the tilt sensor 121 tilts the bucket 110 as far back or vertical as is possible, optionally to angle A4 as described in the current embodiment, which then causes the controller 195 to trigger the load sensors 140 and sense or capture load data, as with the current embodiment described above.

To facilitate service, replacement and general repair or inspection of the load sensors 140, the outer bucket 170 can be outfitted with one or more service holes. For example, the first load sensor 141 can be associated with a first service hole 141H, the second load sensor 142 can be associated with a second service hole 142H; the third load sensor 143 can be associated with a third service hole 143H; and the fourth load sensor 144 can be associated with a fourth service hole 144H. These service holes also can be used to access the wires extending from the respective load sensors to the controller. The wires optionally can be disposed in the space 170S (FIG. 9) between the inner bucket and the outer bucket to protect those wires. In some applications, where the bucket 110 is coupled to a boom, for example, on a telehandler or hydraulically operated boom, it can be well suited to collect load data without tapping into or otherwise using the hydraulic system of the boom and/or the equipment in general. This can be helpful on such telescoping boom machines because the hydraulics can change with the boom extending.

Operation of the bucket 110 of the embodiment in FIGS. 7-11 is virtually the same as the embodiment described above and therefore will be described only briefly here. As with the method above, the bucket 110 can be associated with a piece of equipment 1, and can be operable in a loading mode and a metering mode, identical to the modes described above. The operator of the machine 1 can use an enable switch 25 (FIG. 6) on a display or controller identical to that described in the embodiment above to perform any of the functions mentioned in the embodiment above, for example, to put the system in a loading routine, and/or to go to a loading mode or metering mode as described above. In the loading mode, the equipment pushes the bucket 110 into the material to capture a third load 3B of material. The third load 3B of material is thus disposed in the interior 170I of the inner bucket, and can engage the rear wall 181, transition wall 182, floor 183 and side plates 188S1, 188S2 of that inner bucket. The material also does not enter between the edges of the inner and outer bucket due to the respective cover plates 191 and 192 concealing the edges 181E and 183E of the inner bucket 180, as well as any gaps between those edges and corresponding edges 171E and 173E of the outer bucket 170.

The operator in the cab can lift the boom two and tilt the bucket upward to its uppermost curled extent, for example shown in FIG. 11, or some other angle. In so doing, the bucket 110 can rotate from a horizontal angle A5 through a second angle A4, similar to the angular movement of the bucket described in connection with the embodiment above. Like the embodiment above, the tilt sensor 121 and/or the lift sensor 122 can communicate with the controller 195 or 120 when the bucket 110 is in an appropriate metering position, for example, when the floor 173 is at angle A4, or when the center of mass to COM is in the vertical metering column VMC as described above relative to the ground surface and/or horizontal plane as also described in the embodiment above. The weight of the material in the inner bucket 180 therefore exerts a stress and/or strain on the load sensors 140 between the inner bucket 180 and the outer bucket 170. In some cases, the inner bucket 180 can move ever so slightly relative to the outer bucket 170 under this weight. The load sensors capture data regarding the weight of the third load of material 3B and transfer it to the controller 195, which can transfer that data to the controller 120, which is then displayed on the display 130, which can be identical in structure, function, output and input to the display 30 in FIG. 6, as described in the metering mode of the current embodiment above. The operator can then assess the third load 3B of material to determine if it is adequately loaded enough, that is, whether the bucket 110 is satisfactorily filled to a target load, as with the embodiment above. If it is not, the operator can lower the bucket 110, pushing it into the pile P again and add material to create a fourth load 4B. This fourth load 4B can be elevated in the bucket 110, and the metering mode can be repeated, similar to the metering mode of the second load 2B of the embodiment above. One of the controllers 195, 120 can determine when the bucket 110 is sufficiently tilted and elevated such that the center of mass 2COM is within the vertical metering column VMC defined by the load sensors 140 in a manner similar to that described in the embodiment above. When it is, the controller can trigger the load sensors to capture load data, for example stress or strain in those load sensors, as with the embodiment above. That data can then be transferred and displayed on the display 130 again for the operator to assess whether the current load in the bucket 110 is satisfactorily filled to a target load. If it is, the operator can view this output on the display 130, 30, and operate the machine to the machine 1 can transport the load and continue the loading operations in that job. As with the embodiment above, the display can continue to display the status of the loads, their measurements, and other related information as shown in FIG. 6 until a job is completed with the machine having the bucket described herein.

The following additional statements are provided, the numbering of which is not to be construed as designating levels of importance.

Statement A. A load sensor bucket for mobile equipment, the bucket comprising: a bucket including a rear wall joined with a floor, the bucket having a width axis and a bisecting plane perpendicular to the width axis that divides the bucket into left and right sides; a first upper ear joined with rear wall on the left side; a first lower ear joined with the rear wall on the left side, below the first upper ear; a second upper ear joined with rear wall on the right side; a second lower ear joined with the rear wall on the right side, below the second upper ear; a load frame joined with the bucket, the load frame extending from the left side to the right side, the load frame extending adjacent each of the first upper ear, the first lower ear, the second upper ear and the second lower ear on each of the respective left and right sides; a plurality of load sensors comprising, a first load sensor interposed between the load frame and the first upper ear, a second load sensor interposed between the load frame and the first lower ear, a third load sensor interposed between the load frame and the second upper ear, a fourth load sensor interposed between the load frame and the second lower ear, a quick coupler joined with the load frame and configured to removably connect to an equipment boom, the quick coupler including a first pin recess and a second pin recess, wherein the bucket is selectively tiltable about an axis to a loading mode and to a metering mode, wherein in the loading mode, the bucket is disposed such that the floor is substantially parallel to a ground surface, wherein in the metering mode, the bucket is disposed such that the floor is tilted upward relative to the ground surface, and so that the first, second third and fourth load sensors are oriented to form a vertical metering column that is substantially perpendicular to the ground surface, wherein in the metering mode, the bucket orients a center of mass of material within the vertical metering column so that the plurality of load sensors can measure a load of material in the bucket, whereby an operator of the bucket can determine whether the bucket is loaded to a target amount of material.

Statement B. The bucket of Statement A, wherein the each of the plurality of load sensors are in the form of a pin that projects through a first hole and a second hole defined in the frame, wherein the first hole and the second hole are distal from the first pin recess and the second pin recess of the quick coupler.

Statement C. The bucket of Statement A or B, wherein each of the plurality of load sensors are in communication with a user interface configured to be disposed in the operator's view, wherein each of the plurality of load sensors are configured to communicate a signal to the user interface indicative of the load of material when the bucket is in the metering mode.

Statement D. The bucket of any preceding Statement, wherein the user interface is a display, wherein the display outputs alphanumeric data related to the load of material when the bucket is in the metering mode, whereby the operator of the bucket can determine whether the measured load is at least as great at the target load by viewing the alphanumeric data.

Statement E. The bucket of any preceding Statement, wherein the load frame includes an upper cross bar and a lower cross bar, wherein the quick coupler is joined with at least one of the upper cross bar and the lower cross bar.

Statement F. The bucket of any preceding Statement, wherein the load frame includes a first lateral arm disposed on the left side, the first lateral arm extending generally vertically downward along the rear wall toward the floor, wherein the load frame includes a second lateral arm disposed on the right side, the second lateral arm extending generally vertically downward along the rear wall toward the floor, wherein the upper cross bar includes a first upper bar end joined with the first lateral arm on the left side, and a second upper bar end joined with the second lateral arm on the right side, wherein the lower cross bar includes a first lower bar end joined with the first lateral arm on the left side, and a second lower bar end joined with the second lateral arm on the right side, wherein the quick coupler is joined with the upper and lower cross bars between the first and second lateral arms.

Statement G. The bucket of any preceding Statement, wherein the first lateral arm defines a first lateral arm upper hole, wherein the first load sensor is in the form of a first pin, wherein the first upper ear defines a first upper ear hole, wherein the first pin is disposed in the first lateral arm upper hole and in the first upper ear hole, wherein the first lateral arm defines a first lateral arm lower hole, wherein the second load sensor is in the form of a second pin, wherein the first lower ear defines a first lower ear hole, wherein the second pin is disposed in the first lateral arm lower hole and in the first lower ear hole, wherein the second lateral arm defines a second lateral arm upper hole, wherein the third load sensor is in the form of a third pin, wherein the second upper ear defines a second upper ear hole, wherein the third pin is disposed in the second lateral arm upper hole and in the second upper ear hole, wherein the second lateral arm defines a second lateral arm lower hole, wherein the fourth load sensor is in the form of a fourth pin, wherein the second lower ear defines a second lower ear hole, wherein the third pin is disposed in the second lateral arm lower hole and in the second lower ear hole.

Statement H. The bucket of any preceding Statement, wherein the quick coupler includes a first plate and a distal second plate mounted to and extending from the upper and lower cross bars, wherein the first pin recess is defined by the first plate, wherein the second pin recess is defined by the second plate.

Statement I. The bucket of any preceding Statement, wherein the plurality of load sensors are configured to detect at least one of stress and strain at locations between the load frame and the first and second ears.

Statement J. The bucket of any preceding Statement, wherein the vertical metering column is substantially perpendicular to a horizontal ground surface, and has a rectangular shape in a horizontal plane taken perpendicular to the column.

Statement K. A bucket comprising an outer bucket defining an interior compartment, an inner bucket disposed in the interior compartment, and a plurality of load sensors disposed between the inner bucket and the outer bucket, wherein the plurality of load sensors form a virtual metering column when the bucket is in a metering mode.

Statement L. The bucket of any preceding Statement; wherein the inner bucket includes an inner bucket floor terminating at a forward inner bucket lower edge, wherein the outer bucket is joined with a cover plate that extends over and conceals the forward inner bucket lower edge.

Statement M. The bucket of any preceding Statement, wherein the bucket includes a wear plate at a forward outer bucket lower edge, wherein the cover plate and the wear plate define a gap there between, wherein the forward inner bucket lower edge is disposed within the gap.

Statement N. The bucket of any preceding Statement, comprising a gasket interposed in the gap between the forward inner bucket lower edge and at least one of the wear plate and the cover plate.

Statement O. The bucket of any preceding Statement, wherein the outer bucket outlines a plurality of drain holes extending across a width of the bucket.

Statement P. The bucket of any preceding Statement, wherein the outer bucket defines a load sensor access hole adjacent at least one of the plurality of load sensors, wherein a load sensor can be removed from a space between the inner bucket and the outer bucket through the load sensor access hole.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A load sensor bucket for mobile equipment, the bucket comprising:
an outer bucket including an outer bucket rear wall joined with an outer bucket floor via an outer bucket transition wall, the outer bucket defining a width axis and a bisecting plane perpendicular to the width axis that divides the outer bucket into left and right sides, the outer bucket including an outer bucket interior surface and an opposing outer bucket exterior surface, the outer bucket interior surface forming at least a portion of an outer bucket compartment;
an inner bucket including an inner bucket rear wall joined with an inner bucket floor via an inner bucket transition wall, the inner bucket including an inner bucket interior surface and an inner bucket rear surface, the inner bucket disposed at least partially in the outer bucket compartment, the inner bucket rear surface spaced from the outer bucket interior surface to form a space therebetween;
a plurality of load sensors comprising,
a first load sensor interposed between the outer bucket interior surface and the inner bucket rear surface on the left side;
a second load sensor interposed between the outer bucket interior surface and the inner bucket rear surface on the left side below the first load sensor when the outer bucket floor is generally horizontal;
a third load sensor interposed between the outer bucket interior surface and the inner bucket rear surface on the right side;
a fourth load sensor interposed between the outer bucket interior surface and the inner bucket rear surface on the right side below the second load sensor when the outer bucket floor is generally horizontal;
a quick coupler joined with the outer bucket and configured to removably connect the bucket to an equipment boom,
wherein the bucket is selectively tiltable about an axis to a loading mode and to a metering mode,
wherein in the loading mode, the bucket is disposed such that the outer bucket floor is substantially parallel to a ground surface,
wherein in the metering mode, the bucket is disposed such that the outer bucket floor is tilted upward relative to the ground surface, and so that the first, second third and fourth load sensors are oriented to form a vertical metering column that is substantially perpendicular to the ground surface,
wherein in the metering mode, the bucket orients a center of mass of material within the vertical metering column so that the plurality of load sensors can measure a load of material in the bucket,
whereby an operator of the bucket can determine whether the bucket is loaded to a target amount of material.

2. The bucket of claim 1,
wherein the each of the plurality of load sensors are in the form of a bar that engages the inner bucket rear wall and the outer bucket interior wall within the space,
wherein the outer bucket separates the plurality of load sensors from the quick coupler.

3. The bucket of claim 1,
wherein each of the plurality of load sensors are in communication with a user interface configured to be disposed in the operator's view,
wherein each of the plurality of load sensors are configured to communicate a signal to the user interface indicative of the load of material when the bucket is in the metering mode.

4. The bucket of claim 3,
wherein the user interface is a display,
wherein the display outputs alphanumeric data related to the load of material when the bucket is in the metering mode,
whereby the operator of the bucket can determine whether the measured load is at least as great at the target load by viewing the alphanumeric data.

5. The bucket of claim 1,
wherein the inner bucket rear wall extends from the inner bucket transition wall forwardly to an inner bucket rear wall upper edge,
wherein the inner bucket rear wall is spaced a first distance from the outer bucket rear wall adjacent the inner bucket transition wall,
wherein the outer bucket rear wall extends from the outer bucket transition wall forwardly to an outer bucket rear wall upper edge,
wherein the inner bucket rear wall upper edge is spaced a second distance from the outer bucket rear wall adjacent the outer bucket rear wall upper edge,
wherein the first distance is greater than the second distance.

6. The bucket of claim 5,
wherein the inner bucket floor extends from the inner bucket transition wall forwardly to an inner bucket floor lower edge,
wherein the inner bucket floor is spaced a third distance from the outer bucket floor adjacent the inner bucket transition wall,
wherein the outer bucket floor extends from the outer bucket transition wall forwardly to an outer bucket floor lower edge,
wherein the inner bucket floor forward edge is spaced a fourth distance from the outer bucket floor at the outer bucket rear wall lower edge,
wherein the third distance is greater than the fourth distance.

7. The bucket of claim 6,
wherein the inner bucket floor angles away from a central axis of the bucket toward the outer bucket floor as the inner bucket floor extends forwardly from the inner bucket transition wall.

8. The bucket of claim 1,
wherein the outer bucket defines a plurality of drain holes in the outer bucket transition wall to drain material that enters the space between the inner bucket and the outer bucket.

9. The bucket of claim 8,
wherein the plurality of load sensors are configured to detect at least one of stress and strain at locations between the inner bucket and the outer bucket,
wherein the plurality of drain holes are disposed between the first and second load sensors.

10. The bucket of claim 1,
wherein the vertical metering column is substantially perpendicular to a horizontal ground surface, and has a rectangular shape in a horizontal plane taken perpendicular to the column.

11. A load sensor bucket for mobile equipment, the bucket comprising:
a bucket including an inner bucket nested within an outer bucket, the outer bucket including a floor and an outer bucket interior surface, the inner bucket including an inner bucket rear surface and an inner bucket front edge; and
a plurality of load sensors engaging the inner bucket and the outer bucket,
wherein the bucket is selectively tiltable about an axis to a loading mode and to a metering mode,
wherein in the loading mode, the bucket is configured to load a material in the bucket while the bucket is substantially parallel to a ground surface, and such that in the loading mode the bucket is configured so the material moves above the inner bucket front edge and above the floor toward the inner bucket rear surface,
wherein in the metering mode, the bucket is disposed such that the floor is tilted upward relative to the ground surface and so that the plurality of load sensors are oriented to form a vertical metering column that is substantially perpendicular to a horizontal plane,
wherein in the metering mode, the bucket orients a center of mass of the material within the vertical metering column so that the plurality of load sensors can measure a load of the material in the bucket,
whereby an operator of the bucket can determine whether the bucket is loaded to a target amount of the material.

12. The bucket of claim 11,
wherein the vertical metering column is substantially perpendicular to a horizontal ground surface, and has a polygonal shape in the horizontal plane taken through the column.

13. The bucket of claim 11,
wherein each of the plurality of load sensors are in communication with a user interface configured to be disposed in the operator's view,
wherein each of the plurality of load sensors are configured to communicate a signal to the user interface indicative of the load of material when the bucket is in the metering mode.

14. The bucket of claim 13,
wherein the user interface is a display,
wherein the display is configured to output alphanumeric data related to weight of the load of material when the bucket is in the metering mode,
whereby the operator of the bucket can determine whether the measured load is at least as great as the target load of material by viewing the alphanumeric data.

15. The bucket of claim 14,
wherein the plurality of load sensors are disposed between the outer bucket interior surface and the inner bucket rear surface,
wherein the outer bucket includes an outer bucket transition wall,
wherein the inner bucket includes an inner bucket transition wall, with a space defined between the inner bucket transition wall and the outer bucket transition wall,
wherein the outer bucket defines a plurality of drain holes in fluid communication with the space so that the material in the space can drain from between the inner bucket transition wall and the outer bucket transition wall, out of the space and into the environment.

16. A method of loading material with a machine comprising:
moving a bucket of the machine into a pile of a material, the bucket including a quick coupler coupling the bucket to a machine;
capturing a first bucket load of the material, the first bucket load including a center of mass;
rotating the bucket about at least one axis to position the center of mass within a vertical metering column that is defined by a plurality of load sensors;
detecting at least one first load parameter via the plurality of load sensors to generate a first signal indicative of a first measurement of the first bucket load of material; and
displaying output on a user interface of a machine associated with the first signal so that an operator of the machine can determine whether the first measurement does or does not correspond with a target amount of the material,
wherein the bucket includes an inner bucket and an outer bucket, the inner bucket disposed at least partially in the outer bucket, with the plurality of load sensors engaging the inner bucket and the outer bucket,
wherein the at least one first load parameter is associated with a weight of the material,
wherein the material is impaired from entering a space between the inner bucket and the outer bucket during the moving step via a cover plate that extends over a front edge of the inner bucket.

17. The method of claim 16,
wherein the output is an alphanumeric indicia,
wherein the first measurement does not correspond to the target amount of material,
wherein the method further comprises:
moving the bucket into the pile again to add material to the first bucket load of material, thereby forming a second bucket load of material;
detecting at least one second load parameter via the plurality of load sensors to generate a second signal indicative of a second measurement of the second bucket load of material;
displaying output on the user interface associated with the second signal so that the operator can confirm the second measurement does correspond to the target amount of the material; and
moving the second bucket load of material to another location distal from the pile.

18. A method of loading material with a machine comprising:
moving a bucket of the machine into a pile of a material;
capturing a first bucket load of the material, the first bucket load including a center of mass;
rotating the bucket about at least one axis to position the center of mass within a vertical metering column that is defined by a plurality of load sensors;
establishing the vertical metering column substantially perpendicular to a horizontal plane, the vertical metering column having a polygonal cross section shape relative to the horizontal plane,
detecting at least one first load parameter via the plurality of load sensors to generate a first signal indicative of a first measurement of the first bucket load of material; and
displaying output on a user interface of a machine associated with the first signal so that an operator of the machine can determine whether the first measurement does or does not correspond with a target amount of the material,
wherein respective ones of the plurality of load sensors form respective corners of the polygonal cross section shape of the vertical metering column.

19. A method of loading material with a machine comprising:
moving a bucket of the machine into a pile of a material;
capturing a first bucket load of the material, the first bucket load including a center of mass;
rotating the bucket about at least one axis to position the center of mass within a vertical metering column that is defined by a plurality of load sensors located between an inner bucket and an outer bucket;
detecting at least one first load parameter via the plurality of load sensors to generate a first signal indicative of a first measurement of the first bucket load of material; and
displaying output on a user interface of a machine associated with the first signal so that an operator of the machine can determine whether the first measurement does or does not correspond with a target amount of the material.

20. A method of loading material with a machine comprising:
moving a bucket of the machine into a pile of a material, the bucket including an inner bucket and an outer bucket, the inner bucket disposed at least partially in the outer bucket;
capturing a first bucket load of the material, the first bucket load including a center of mass;

rotating the bucket about at least one axis to position the center of mass within a vertical metering column that is defined by a plurality of load sensors engaging at least one of the inner bucket and the outer bucket;

detecting at least one first load parameter via the plurality of load sensors to generate a first signal indicative of a first measurement of the first bucket load of material; and displaying output on a user interface of a machine associated with the first signal and a target amount of material.

* * * * *